(12) United States Patent
Toyama et al.

(10) Patent No.: US 10,941,282 B2
(45) Date of Patent: Mar. 9, 2021

(54) CELLULOSE RESIN COMPOSITION, MOLDED BODY AND PRODUCT USING SAME

(71) Applicants: NEC CORPORATION, Tokyo (JP); Yutaro Shimode, Kyoto (JP)

(72) Inventors: Kiyohiko Toyama, Tokyo (JP); Masatoshi Iji, Tokyo (JP); Kunihiko Ishihara, Tokyo (JP); Yutaro Shimode, Kyoto (JP)

(73) Assignees: NEC CORPORATION, Tokyo (JP); Yutaro Shimode, Kyoto (JP)

( * ) Notice: Subject to any disclaimer, the term of this patent is extended or adjusted under 35 U.S.C. 154(b) by 0 days.

(21) Appl. No.: 16/309,977

(22) PCT Filed: Jun. 15, 2017

(86) PCT No.: PCT/JP2017/022179
§ 371 (c)(1),
(2) Date: Dec. 14, 2018

(87) PCT Pub. No.: WO2017/217504
PCT Pub. Date: Dec. 21, 2017

(65) Prior Publication Data
US 2019/0330450 A1  Oct. 31, 2019

(30) Foreign Application Priority Data
Jun. 17, 2016 (JP) .............................. JP2016-121280

(51) Int. Cl.
| | | |
|---|---|---|
| *C08L 1/14* | (2006.01) | |
| *C08B 3/16* | (2006.01) | |
| *C08K 3/04* | (2006.01) | |
| *C08K 5/521* | (2006.01) | |
| *C08K 13/02* | (2006.01) | |
| *C08L 25/12* | (2006.01) | |

(52) U.S. Cl.
CPC .................. *C08L 1/14* (2013.01); *C08B 3/16* (2013.01); *C08K 3/04* (2013.01); *C08K 5/521* (2013.01); *C08K 13/02* (2013.01); *C08L 25/12* (2013.01); *C08K 2201/005* (2013.01); *C08K 2201/011* (2013.01); *C08L 2205/06* (2013.01)

(58) Field of Classification Search
CPC ...... C08L 1/14; C08L 1/10; C08L 1/12; C08L 25/12; C08K 3/04; C08K 5/521
See application file for complete search history.

(56) References Cited

U.S. PATENT DOCUMENTS

| | | | | |
|---|---|---|---|---|
| 2,381,511 A | * | 8/1945 | Muskat ............. | C08K 5/10 106/170.28 |
| 2,781,326 A | * | 2/1957 | Ellis, Jr. ........... | C08L 61/06 523/210 |
| 3,376,149 A | * | 4/1968 | Gandy .............. | C08L 1/12 106/162.72 |
| 4,451,597 A | * | 5/1984 | Victorius .......... | C09D 133/066 427/409 |
| 7,217,405 B2 | * | 5/2007 | Karl ................. | C09C 1/56 423/449.1 |
| 8,927,629 B2 | * | 1/2015 | Sawai ............... | C08K 5/0066 524/35 |
| 2008/0014373 A1 | * | 1/2008 | Muramatsu ....... | C08L 1/12 428/1.1 |
| 2013/0085213 A1 | * | 4/2013 | Imanishi ........... | C08L 1/14 524/40 |
| 2013/0150501 A1 | * | 6/2013 | Basu ................. | C08L 1/12 524/41 |
| 2015/0221411 A1 | * | 8/2015 | Nakamura ........ | C08K 3/041 252/511 |
| 2016/0005886 A1 | * | 1/2016 | Zou, III ............ | G02B 1/118 136/256 |
| 2016/0068665 A1 | * | 3/2016 | Budhavaram ..... | C08L 23/12 264/328.1 |
| 2017/0210888 A1 | * | 7/2017 | An .................... | C08K 3/04 |
| 2019/0169402 A1 | * | 6/2019 | Toyama ............ | C08B 3/16 |
| 2020/0153260 A1 | * | 5/2020 | Yuen ................ | G04G 17/08 |

FOREIGN PATENT DOCUMENTS

| | | |
|---|---|---|
| JP | 3-059097 A | 9/1991 |
| JP | 2005-132970 A | 5/2005 |
| JP | 2005-181387 A | 7/2005 |
| JP | 2005-194302 A | 7/2005 |
| JP | 2011-132457 A | 7/2011 |
| JP | 2012-036326 A | 2/2012 |
| JP | 2012-211253 A | 11/2012 |
| JP | 2012-241055 A | 12/2012 |
| JP | 2013-112781 A | 6/2013 |
| JP | 2015-172150 A | 10/2015 |
| WO | 2010/047351 A1 | 4/2010 |
| WO | 2011/078273 A1 | 6/2011 |
| WO | 2011/078292 A1 | 6/2011 |
| WO | 2013/147143 A1 | 10/2013 |

OTHER PUBLICATIONS

Manfred Voll & Peter Kleinschmit, "Carbon, 6. Carbon Black," 7 Ullmann's Encyclopedia of Industrial Chemistry 1, published online 2010 (22 pages).*
Triphenyl phosphate data from PubChem, https://pubchem.ncbi.nlm.nih.gov/compound/8289, downloaded Feb. 1, 2020.*
Cellulose acetate data from MatWeb, downloaded Feb. 1, 2020.*
Masatoshi Iji et al., "Dento Kogei no Shikki ga Motsu Utsukushisa o Jitsugen shita Hishokuyo Shokubutsu Genryo no Bioplastic no Kaihatsu", NEC, Sep. 2016, pp. 1 to 15.

(Continued)

*Primary Examiner* — Nicholas E Hill
(74) *Attorney, Agent, or Firm* — Sughrue Mion, PLLC

(57) ABSTRACT

A cellulose resin composition comprising a cellulose resin, a high refractive-index organic material and a carbon black, in which the cellulose resin is an acylated cellulose obtained by substituting at least part of hydrogen atoms of hydroxy groups of a cellulose with an acyl group having 2 to 4 carbon atoms, the carbon black is an acidic carbon black, the mass fraction (B/A) of the high refractive-index organic material (B) to the cellulose resin (A) falls within the range of 10/90 to 70/30, and the content of the carbon black (C) relative to the total of the cellulose resin composition falls within the range of 0.05 to 10% by mass.

18 Claims, No Drawings

(56) References Cited

OTHER PUBLICATIONS

Masatoshi Iji et al., "Dento Kogei no Shikki no Utsukushii (Urushi Black) o Jitsugen suru Cellulose-kei Bioplastic", Biopla Journal, Nov. 2016, pp. 15 to 20, vol. 63.
Masatoshi Iji et al., "Dento Kogei no Shikki no Utsukushisa o Jitsugen suru Bioplastic (UrushiBlack•Bioolastic) no Kaihatsu". Plastics Age. Dec. 2016. pp. 58 to 62. vol. 62. No. 12.
International Search Report for PCT/JP2017/022179 dated Sep. 12, 2017 [PCT/ISA/210].

* cited by examiner

CELLULOSE RESIN COMPOSITION, MOLDED BODY AND PRODUCT USING SAME

CROSS REFERENCE TO RELATED APPLICATIONS

This application is a National Stage of International Application No. PCT/JP2017/022179 filed Jun. 15, 2017, claiming priority based on Japanese Patent Application No. 2016-121280 filed Jun. 17, 2016, the disclosure of which is incorporated herein in its entirety by reference.

TECHNICAL FIELD

The present invention relates to a cellulose resin composition, a molded body formed of the resin composition and a product using the molded body.

BACKGROUND ART

Bioplastic using a plant as a raw material can contribute to a countermeasure against petroleum depletion and global warming and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As a raw material of a non-edible part, cellulose which is a main component of wood and plant is representative, and various types of bioplastics using the cellulose have been already developed and commercialized.

For example, Patent Literature 1 describes a resin composition containing a cellulose resin and a phosphazene compound, the content of which is 5 to 300% by mass relative to the cellulose resin. The literature states that a molded body obtained by molding the resin composition is excellent in hygrothermal resistance.

Patent Literature 2 describes a resin composition constituted of a cellulose ester (cellulose acetate) having the average substitution degree of 2.7 or less, a phosphoric acid ester as a plasticizer and a filler. The literature states that such a resin composition is small in environment load and excellent in flowability; and that a molded body obtained by molding the resin composition has satisfactory rigidity, dimensional accuracy and flame retardance.

Patent Literature 3 describes a resin composition containing a cellulose resin, a non-cellulose thermoplastic resin (a thermoplastic resin having an aromatic ring such as an aromatic polycarbonate resin) and a fluorene compound having a 9,9-bisarylfluorene skeleton. The literature states that such a resin composition can improve formability or processability. The literature also states that since the fluorene compound forms into a complex, a cellulose resin composition excellent in properties such as transparency, heat-resistance, water resistance and surface hardness can be obtained.

Patent Literature 4 states that a resin composition containing a cellulose propionate resin (10 to 80% by weight) and an acrylonitrile styrene resin (20 to 90% by weight). The literature states that such a resin composition can form a molding more improved in heat-resistance than the cellulose propionate resin and having pearl-like gloss.

On another front, it has been recently desired to develop a resin molding having high external-appearance quality without coating. If a resin molding is not coated, cost for discharging volatile organic compounds (VOC) during a production process and coating cost can be saved. As for the molding obtained, a negative change in appearance caused by removal and degradation of coating can be overcome.

For example, Patent Literature 5 describes a thermoplastic resin composition containing a graft copolymer formed of a rubber polymer, a copolymer formed of a predetermined vinyl monomer, a predetermined polyester, and carbon black and/or a dye serving as a colorant in a predetermined ratio. The literature also states that an injection molding obtained by injection-molding the composition has high impact resistance and high external-appearance quality (glossy and jet-black color).

Patent Literature 6 describes a black resin composition containing a predetermined copolymerized polycarbonate resin, a colorant (carbon black and/or black organic dye) and a hindered amine based stabilizer and having specific properties (pencil hardness, low-temperature impact resistance, brittle fracture rate, glossiness, brightness). The literature also states that the black molding of the black resin composition has an excellent jet-black color and excellent low-temperature impact resistance, weather resistance, abrasion-resistance and heat-resistance.

Patent Literature 7 describes a black resin composition containing a predetermined copolymerized polycarbonate resin, a styrene resin, an impact modifier (rubber-modified resin) and carbon black in a predetermined blending ratio. The literature also states that a molding of the black resin composition has excellent jet-black color and excellent impact resistance, flowability, abrasion-resistance and heat-resistance.

Patent Literature 8 describes a thermoplastic resin composition containing a predetermined graft copolymer (1 to 99 parts by mass), a vinyl copolymer (99 to 1 part by mass), and other thermoplastic resins (0 to 80 parts by mass) and also containing a predetermined organic dye. The literature also states that a molded body of the composition is excellent in impact resistance, weather resistance, jet-black color, surface smoothness and abrasion-resistance. The literature also states that the thermoplastic resin composition of Comparative Example 3, which contains a pigment (carbon black: Mitsubishi carbon #2600 (trade name) manufactured by Mitsubishi Chemical Corporation) in place of an organic dye, is unsatisfactory in jet-black color and surface smoothness.

CITATION LIST

Patent Literature

Patent Literature 1: JP2012-36326A
Patent Literature 2: JP2005-194302A
Patent Literature 3: JP2012-211253A
Patent Literature 4: JP H03-59097B2
Patent Literature 5: WO2013/147143
Patent Literature 6: JP2015-172150A
Patent Literature 7: JP2013-112781A
Patent Literature 8: JP2005-132970A

SUMMARY OF INVENTION

Technical Problem

An object of the present invention is to provide a cellulose resin composition, from which a molded body having high external-appearance quality can be formed, a molded body formed of the resin composition and a product using the molded body.

Solution to Problem

According to an aspect of the present invention, there is provided a cellulose resin composition comprising a cellulose resin (A), a high refractive-index organic material (B) and a carbon black (C), in which the cellulose resin (A) is an acylated cellulose obtained by substituting at least part of hydrogen atoms of hydroxy groups of a cellulose with an acyl group having 2 to 4 carbon atoms, the carbon black (C) is an acidic carbon black, the mass fraction (B/A) of the high refractive-index organic material (B) to the cellulose resin (A) falls within the range of 10/90 to 70/30, and the content of the carbon black (C) relative to the total of the cellulose resin composition falls within the range of 0.05 to 10% by mass.

According to another aspect of the present invention, there is provided a molded body formed of the above cellulose resin composition.

According to another aspect of the present invention, there is provided a product using the above molded body.

Advantageous Effects of Invention

According to exemplary embodiments, it is possible to provide a cellulose resin composition, from which a molded body having high external-appearance quality can be formed, a molded body formed of the resin composition and a product using the molded body.

DESCRIPTION OF EMBODIMENTS

Now, the exemplary embodiments will be described below.

A cellulose resin composition according to an exemplified embodiment contains a cellulose resin (A), a high refractive-index organic material (B) and a carbon black (C). It is preferable that the mass fraction (B/A) of the high refractive-index organic material (B) to the cellulose resin (A) falls within the range of 10/90 to 70/30. It is preferable that the carbon black (C) is an acidic carbon black and the content thereof relative to the total of the cellulose resin composition falls within the range of 0.05 to 10% by mass.

A molded body having high external-appearance quality can be formed by using the cellulose resin composition according to the exemplified embodiment. The higher the glossiness of the molded body and the lower the brightness, a higher external-appearance quality can be obtained. At this time, the lower the brightness, the higher the jet-black color.

In the cellulose resin composition, it is preferable that the total content of the cellulose resin (A) and the high refractive-index organic material (B) relative to the amount of the cellulose resin composition excluding the carbon black (C) is 90% by mass or more.

The cellulose resin (A) is an acylated cellulose obtained by substituting at least part of hydrogen atoms of hydroxy groups of a cellulose with an acyl group having 2 to 4 carbon atoms. The acyl group is at least one acyl group selected from acyl groups having 2 to 4 carbon atoms, and preferably an acetyl group or/and a propionyl group.

It is preferable that the high refractive-index organic material (B) has a larger refractive index than the cellulose resin (A).

It is preferable that the high refractive-index organic material is an organic compound having at least one group selected from an aromatic ring, a phosphorus atom-containing group, a sulfur atom-containing group, a halogen group except fluorine, an alicyclic group and an organic metal portion. It is more preferable that the high refractive-index organic material has at least an aromatic ring.

It is preferable that the high refractive-index organic material is at least one selected from a high refractive-index resin, a phosphorus organic compound, a sulfur organic compound, a triazine compound, a fluorene derivative and a benzophenone compound.

It is preferable that the high refractive-index organic material (B) includes at least a high refractive-index resin (B1). It is preferable that the high refractive-index resin (B1) is a copolymer of acrylonitrile and styrene. In the case where a high refractive-index resin (B1) is contained, it is preferable that a plasticizer (B2) is further contained as the high refractive-index organic material (B). The plasticizer (B2) is preferably a phosphorus organic compound, and more preferably a phosphoric acid ester.

It is preferable that the phosphoric acid ester has a larger refractive index than the cellulose resin (A). It is also preferable that the phosphoric acid ester is an organic compound having an aromatic ring.

It is preferable that the mass fraction (B2/B1) of the plasticizer (B2) to the high refractive-index resin (B1) is 10/90 to 70/30.

The high refractive-index organic material (B) may be a phosphorus organic compound (including no high refractive-index resin). It is preferable that the phosphorus organic compound is a phosphoric acid ester.

It is preferable that the phosphoric acid ester has a larger refractive index than the cellulose resin (A)

It is preferable that the phosphoric acid ester is an organic compound having an aromatic ring.

The high refractive-index organic material (B) may be a phosphazene compound (including no high refractive-index resin).

It is preferable that the phosphazene compound has a larger refractive index than the cellulose resin (A).

It is preferable that the phosphazene compound is an organic compound having an aromatic ring.

The high refractive-index organic material (B) may be a fluorene derivative (including no high refractive-index resin). It is preferable that the fluorene derivative has a larger refractive index than the cellulose resin (A).

In the exemplary embodiment, the "aromatic ring" can be present within a molecular structure of a compound as an aromatic ring group (aromatic group). The aromatic ring group refers to a cyclic group having aromaticity and may be a single-ring group or a condensed ring group, and may be an aromatic hydrocarbon ring group (aryl group) or an aromatic hetero-cyclic group (heteroaryl group); and may or may not have a further substituent. Examples of the aromatic ring constituting the aromatic ring group include, but are not limited to, a benzene ring and a naphthalene ring, which each provide an aryl group; and a furan ring, a thiophene ring, a pyrrole ring, an imidazole ring and a pyridine ring, which each provide a heteroaryl group. Examples of the aryl group include a phenyl group, which is derived from a benzene ring as an aromatic ring; and a 1-naphthyl group and a 2-naphthyl group, which are each derived from a naphthalene ring as an aromatic ring. The heteroaryl group is a heteroaromatic ring group containing one or more hetero atoms. Examples of the hetero atoms include oxygen atom, nitrogen atom and sulfur atom. The heteroaryl group preferably has 5 or 6 ring atoms including a hetero atom. Specific examples of the heteroaryl group include a furyl group, a thienyl group, a pyrrolyl group, an imidazolyl group and a pyridyl group.

The aromatic ring group may be substituted. In the case where the aromatic ring group is "substituted", examples of a substituent include, but are not limited to, a hydroxy group; a halogen atom (for example, a fluorine atom, a chlorine atom, a bromine atom and an iodine atom); an amino group; a mono or dialkylamino group (for example, a dimethylamino group, a diethylamino group and a dibutylamino group); a nitro group; a cyano group; an alkyl group (for example, a C1-8 alkyl group); a C1-8 alkoxy group (for example, a methoxy group, an ethoxy group and an isopropoxy group); and a C3-8 cycloalkyl group.

It is preferable that the refractive index of the high refractive-index organic material (B) is 1.50 or more. It is also preferable that the high refractive-index organic material (B) is a compatible organic material that is compatible with the cellulose resin (A).

It is preferable that the carbon black (C) is acidic carbon black and has a pH value of 5 or less. It is also preferable that the average particle diameter of the carbon black falls within the range of 1 to 20 nm.

Now, the exemplary embodiments will be more specifically described below.

(Cellulose Resin)

As the cellulose resin (cellulose derivative) contained in a cellulose resin composition according to the exemplary embodiment, a cellulose resin obtained by introducing an acyl group having 2 to 4 carbon atoms into at least part of hydroxy groups of a cellulose serving as a raw material, can be used.

<Cellulose>

Cellulose is a straight-chain polymer obtained by polymerizing β-D-glucose molecules (β-D-glucopyranose) represented by the following formula (1) via a β (1→4) glycoside bond. Each of the glucose units constituting a cellulose has three hydroxy groups (where n represents a natural number). In the exemplary embodiment, an acyl group is introduced into the cellulose by using these hydroxy groups.

[Formula 1]

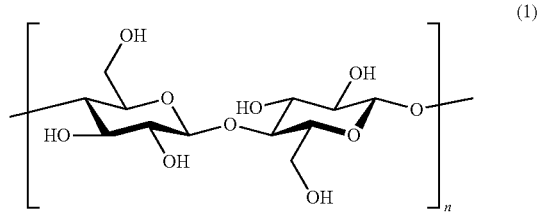

(1)

Cellulose is a main component of a plant and can be obtained by a separation treatment for removing other components such as lignin from a plant. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 ∞m) and a length of 10 μm to 100 mm (preferably 100 μm to 10 mm) can be used.

The polymerization degree of a cellulose in terms of polymerization degree (average polymerization degree) of glucose preferably falls within the range of 50 to 5000, more preferably 100 to 3000 and further preferably 500 to 3000. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

<Cellulose Derivative>

The cellulose resin (cellulose derivative) used in the exemplary embodiment can be obtained by introducing an acyl group having 2 to 4 carbon atoms by use of hydroxy groups of a cellulose. A single type or two types or more of acyl groups may be introduced as the acyl group.

The above acyl group can be introduced by reacting a hydroxy group of a cellulose and an acylating agent. The acyl group corresponds to an organic group portion introduced in place of a hydrogen atom of a hydroxy group of a cellulose. The acylating agent is a compound having at last one functional group reactive to a hydroxy group of a cellulose; for example, compounds having a carboxyl group, a carboxylic halide group or a carboxylic anhydride group, can be mentioned. Specific examples of the compound include aliphatic monocarboxylic acid, an acid halide and acid anhydride thereof.

Examples of an acyl group having 2 to 4 carbon atoms include an acetyl group, a propionyl group, a butyryl group and an isobutyryl group. Of them, an acyl group (acetyl group, propionyl group) having 2 or 3 carbon atoms is preferable. A single type or two types or more of acyl groups can be introduced into a cellulose. More specifically, the cellulose resin in the exemplary embodiment is obtained by substituting the hydrogen atom of a hydroxy group of a cellulose with an acyl group having 2 to 4 carbon atoms. As the acyl group, an acetyl group or/and propionyl group are preferably used. Examples of the cellulose resin include acetyl cellulose, propionyl cellulose and acetyl propionyl cellulose.

The average number of acyl groups to be introduced per glucose unit of a cellulose ($DS_{AC}$) (an acyl group introduction ratio); in other words, the average number of hydroxyl groups substituted with acyl groups per glucose unit (degree of substitution of a hydroxyl group) can be set to fall within the range of 0.1 to 3.0. In order to obtain an introduction effect of an acyl group sufficiently, particularly, in view of e.g., water resistance and flowability, $DS_{AC}$ is preferably 2.0 or more, more preferably 2.2 or more and further preferably 2.4 or more. In order to obtain the effect of other groups (e.g., hydroxy group) while obtaining the introduction effect of an acyl group sufficiently, $DS_{AC}$ is preferably 2.9 or less and more preferably 2.8 or less.

By introducing an acyl group as mentioned above into a cellulose, it is possible to reduce intermolecular force (intramolecular bond) of the cellulose and plasticity thereof can be improved.

As the residual amount of hydroxy groups increases, the maximum strength and heat-resistance of the cellulose resin tend to increase; whereas water absorbability tends to increase. In contrast, as the conversion rate (degree of substitution) of hydroxy groups increases, water absorbability tends to decrease, plasticity and breaking strain tend to increase; whereas, maximum strength and heat resistance tend to decrease. In consideration of these tendencies etc., the conversion rate of hydroxy groups can be appropriately set.

The average number of the remaining hydroxy groups per glucose unit of a cellulose resin (hydroxy group remaining degree) can be set to fall within the range of 0 to 2.9. In view of e.g., maximum strength and heat-resistance, hydroxy groups may remain. For example, the hydroxy group remaining degree may be 0.01 or more and further 0.1 or more. Particularly, in view of flowability, the hydroxy group remaining degree of a final cellulose resin is preferably 1.0 or less, more preferably 0.8 or less and particularly preferably 0.6 or less. Further, in view of, e.g., water resistance and impact resistance in addition to flowability, the hydroxy group remaining degree is preferably 0.6 or less, more preferably 0.5 or less, further preferably 0.4 or less, and particularly preferably 0.2 or less.

The molecular weight of a cellulose resin, more specifically, the weight average molecular weight thereof falls within the range of preferably 10000 to 200000, more preferably, 50000 to 200000 and further preferably 50000 to 150000. If the molecular weight is excessively large, flowability becomes low. As a result, it becomes difficult to not only process the cellulose resin but also uniformly mix it. In contrast, if the molecular weight is excessively small, physical properties thereof such as impact resistance decrease. The weight average molecular weight can be determined by gel permeation chromatography (GPC) (commercially available standard polystyrene can be used as a reference sample).

(High Refractive-Index Organic Material)

As the high refractive-index organic material contained in the cellulose resin composition according to the exemplary embodiment, a high refractive-index organic material which does not significantly decrease the refractive index of a cellulose resin composition is preferable; and more specifically, a high refractive-index organic material having a refractive index of 1.50 or more is preferably used. Also, a high refractive-index organic material having a larger refractive index than that of the cellulose resin to be used is preferable. As such a high refractive-index organic material, an organic compound having at least one group selected from an aromatic ring, a phosphorus atom-containing group, a sulfur atom-containing group, a halogen group except fluorine, an alicyclic group and an organic metal portion, can be used; and a high refractive-index organic material at least containing an aromatic ring is preferable.

Note that, the refractive index is refractive index $n_D$ of D line (light having a wavelength of 589.3 nm) of a sodium lamp, and can be measured by the Abbe refractometer.

The high refractive-index organic material preferably has a solubility to a cellulose resin (compatibility with a cellulose resin). The solubility can be represented based on the SP value (compatibility parameter, unit: $(cal/cm^3)^{1/2}$) calculated by the Fedors method. The high refractive-index organic material having a SP value, which differs by 3 or less in terms of absolute value from the SP value of a cellulose resin, is suitably used. For example, the high refractive-index organic material having a difference in SP value of 2 or less, can be used. In general, as the difference (absolute value) in SP value decreases, the compatibility tends to increase. As the compatibility increases, the transparency of a molded body (colorant-free) tends to increase, with the result that problems caused by phase separation, such as white turbidity, spots and bleed out, can be avoided and the appearance-quality of the molded body can be enhanced.

Note that, the SP value is represented by the following expression.

$$SP \text{ value } (\delta) = (\Delta H/V)^{1/2}$$

where $\Delta H$ represents molar heat of vaporization (cal/mol); and V represents molar volume ($cm^3$/mol).

As $\Delta H$ and V in the expression, the total ($\Delta H$) of molar heat of vaporization of the atomic group and the total (V) of molar volumes described in POLYMER ENGINEERING AND FEBRUARY, 1974, Vol. 14, No. 2, Robert F. Fedors. (pages 151 to 153) can be used.

As the high refractive-index organic material compatible with a cellulose resin, a compound having a polar group can be used. Examples of the polar group include nitrogen atom-containing groups such as a cyano group (CN), and a triazine group; phosphorus atom-containing groups such as a phosphate group ($PO_4$ group) and a phosphazene group; sulfur atom-containing groups such as a sulfonyl ($SO_2$) group, a sulfide group (—S—) and a disulfide group (—S—S—); and oxygen atom-containing groups such as a carbonyl group (C=O), a hydroxy group (OH) and an ether group (C—O—C).

In view of refractive index and compatibility, the high refractive-index organic material is preferably an organic compound having both an aromatic ring and a polar group.

Examples of the high refractive-index organic material include high refractive-index resins such as a copolymer of acrylonitrile and styrene (AS resin); phosphorus organic compounds such as a phosphoric acid ester and hexaphenoxycyclotriphosphazene; sulfur organic compounds such as diphenyl sulfone, diphenyl sulfide, diphenyl disulfide and DBSP (2,4-bisphenylsulfonylphenol); triazine-based compounds; fluorene derivatives such as bisphenoxyethanol fluorene (BPEF); and benzophenone-based compounds.

In the AS resin, a copolymerization ratio (AN/St mass ratio) of acrylonitrile (AN) and styrene (St) is preferably 20/80 to 40/60, more preferably 20/80 to 35/65 and particularly preferably 25/75 to 30/70.

The molecular weight of the AS resin in terms of weight average molecular weight preferably falls within the range of 10,000 to 200,000, more preferably within the range of 20,000 to 150,000 and further preferably within the range of 20,000 to 100,000. If the molecular weight is excessively large, flowability of the resin decreases and it becomes difficult to process and uniformly mix the resin. Conversely, if the molecular weight is excessively small, physical properties such as impact resistance decrease. The weight average molecular weight can be determined by gel permeation chromatography (GPC) (in terms of standard polystyrene).

As the phosphoric acid ester, at least one selected from the following aromatic phosphates can be used.

Aromatic condensed phosphate compound (for example, PX-200 (trade name) manufactured by DAIHACHI CHEMICAL INDUSTRY CO., LTD.) represented by the following formula:

[Formula 2]

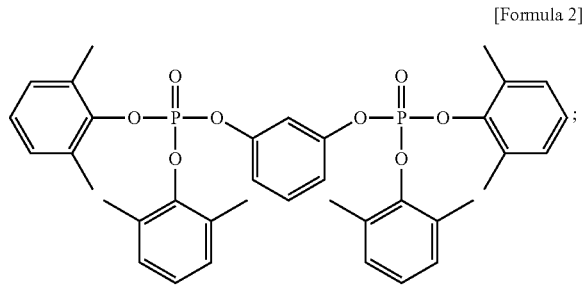 [SMILES: Cc1cccc(C)c1OP(=O)(Oc1cccc(OP(=O)(Oc2c(C)cccc2C)Oc2c(C)cccc2C)c1)Oc1c(C)cccc1C]

Aromatic condensed phosphate compound (for example, CR-733S (trade name) manufactured by DAIHACHI CHEMICAL INDUSTRY CO., LTD.) represented by $(C_6H_5O)_2P(O)OC_6H_4OP(O)(OC_6H)_2$;

Aromatic condensed phosphate compound (for example, CR-741 (trade name) manufactured by DAIHACHI CHEMICAL INDUSTRY CO., LTD.) represented by $(C_6H_5O)_2P(O)OC_6H_4C(CH_3)_2C_6H_4OP(O)(OC_6H)_2$;

Triphenyl phosphate (for example, TPP (trade name) manufactured by DAIHACHI CHEMICAL INDUSTRY CO., LTD.);

Tricresyl phosphate (for example, TCP (trade name) manufactured by DAIHACHI CHEMICAL INDUSTRY CO., LTD);

Trixylenyl phosphate (for example, TXP (trade name) manufactured by DAIHACHI CHEMICAL INDUSTRY CO., LTD.);

Cresyl diphenyl phosphate (for example, CDP (trade name) manufactured by DAIHACHI CHEMICAL INDUSTRY CO., LTD.);

Cresyl di-2,6-xylenyl phosphate (for example, PX-110 (trade name) manufactured by DAIHACHI CHEMICAL INDUSTRY CO., LTD.).

Of the aromatic phosphates, an aromatic condensed phosphate having a large molecular weight and rarely volatile is preferable, in view of appearance of a molded body.

As the triazine-based compound, a compound represented by the following formula is mentioned.

[Formula 3]

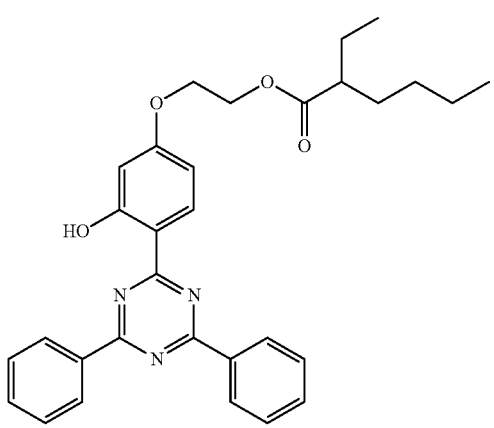

As the benzophenone-based compound, a compound represented by the following formula is mentioned.

[Formula 4]

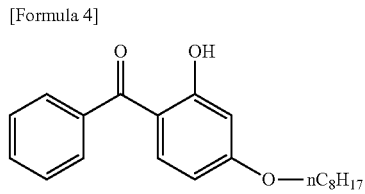

(Carbon Black)

The carbon black to be contained in the cellulose resin composition according to the exemplified embodiment is preferably acidic, more specifically, has a pH value of preferably 5 or less, more preferably 4 or less and further preferably 3.5 or less. If such an acidic (low pH value) carbon black is used, the brightness of the resultant molded body can be reduced. For example, carbon black having preferably pH 2.5 to 4 and more preferably pH 2.5 to 3.5 can be suitably used.

The pH value is obtained by measuring a mixed solution of carbon black and distilled water by a glass-electrode pH meter and specifically, measured in accordance with the following method. A pure water (100 ml) boiled and degassed is added to a sample (10 g). The mixture is boiled on a hot plate for 15 minutes and cooled to room temperature. Thereafter, the supernatant is removed and pH of the resultant muddy substance is measured by a glass-electrode pH meter.

Due to interaction or binding of an acidic group (for example, carboxylic acid group) on the surface of such acidic carbon black and a polar group (for example, hydroxy group) of a cellulose resin, affinity thereof is improved and high dispersion of carbon black occurs, which presumably contributes to reduction in brightness.

The average particle diameter of carbon black is preferably 1 to 20 nm, more preferably 5 to 20 nm and further preferably 8 to 18 nm. As the average particle diameter decreases, the brightness of a molded body decreases, with the result that high-quality black (jet black) appearance tends to be obtained. Conversely, as the average particle diameter increases, dispersibility tends to increase. In view of these points, carbon black having a particle diameter within the above range is preferably used.

The average particle diameter is the arithmetic average diameter of carbon black particles obtained by observing the particles by an electron microscope.

The specific surface area of carbon black is preferably 140 $m^2/g$ or more, and more preferably 180 $m^2/g$ or more, in view of, e.g., jet-black color of a molded body. Also, in view of, e.g., dispersibility, carbon black having a specific surface area of 1000 $m^2/g$ or less, 700 $m^2/g$ or less, and further 500 $m^2/g$ or less, can be used. The relationship between the particle diameter and the specific surface area is as follows: In general, as the particle diameter decreases, the specific surface area increases. In view of brightness and appearance of a molded body and dispersibility of particles, carbon black having a BET specific surface area within the above range is preferably used.

The specific surface area is BET specific surface area (JIS K6217) obtained from nitrogen adsorption amount in accordance with S-BET equation.

(Cellulose Resin Composition)

The cellulose resin composition according to the exemplary embodiment contains a cellulose resin (A), a high refractive-index organic material (B) and carbon black (C).

The mass fraction (B/A) of the high refractive-index organic material (B) to the cellulose resin (A) falls preferably within the range of 10/90 to 70/30, and more preferably within the range of 15/85 to 65/35. If the mass fraction (B/A) falls within the range, it is possible to obtain a molded body having high external-appearance quality (particularly high glossiness) while keeping mechanical characteristics mainly provided by a cellulose resin.

When at least a high refractive-index resin is used as the high refractive-index organic material (B), if the high refractive-index resin is sufficiently compatible with a cellulose resin, the refractive index increases as the content of the high refractive-index resin increases and the glossiness of the molded body can be enhanced. Because of this, the mass fraction (B/A) can be set to be 20/80 or more and also 30/70 or more.

In contrast, if a low molecule compound (for example, a phosphoric acid ester) alone is used as the high refractive-index organic material (B), as the content increases, bleed out tends to easily occur. Because of this, the mass fraction (B/A) is preferably 50/50 or less, more preferably 30/70 or less and further preferably 20/80 or less.

If a high refractive-index resin is used as the high refractive-index organic material (B), it is preferable to use a high refractive-index organic material serving as a plasticizer in combination. If the plasticizer is used, the molding temperature can be reduced first and phase separation between mutual resins rarely occurs. Further, since the plasticizer itself has a high refractive index, the refractive index of a cellulose resin composition can be increased. As a result, a molded body having high external-appearance quality can be obtained.

From such a view point, the mass fraction (B2/B1) of the plasticizer (B2) relative to the high refractive-index resin (B1) is preferably 10/90 to 70/30, more preferably 20/80 to 50/50 and further preferably, 25/75 to 40/60. As the content of the plasticizer (B2) increases, compatibility can be enhanced. If the content of the plasticizer is excessively large, bleed out tends to easily occur. Because of this, the mass fraction (B2/B1) is preferably set to fall within the above range. The ratio of the plasticizer component (B2) to the resin component (A+B1), B2/(A+B1), is preferably, 3/97 to 50/50, more preferably, 5/95 to 30/70, and further preferably 5/95 to 20/80.

As the plasticizer, a phosphorous organic compound is preferable. In particular, a phosphoric acid ester high in plasticity is preferable. Also, a phosphorous compound having a larger refractive index than that of a cellulose resin is preferable. The refractive index thereof is larger than 1.50 is more preferable. As such a phosphorous organic compound, a phosphorous organic compound having an aromatic ring and preferably a phosphoric acid ester having an aromatic ring can be used.

The content of carbon black (C) in the cellulose resin composition according to the exemplary embodiment relative to the whole the cellulose resin composition can be set to fall within the range of 0.05 to 10% by mass. In order to obtain a sufficient coloring effect, the content of carbon black is preferably 0.1% by mass or more, preferably 0.2% by mass or more, and further preferably 0.5% by mass or more. In order to reduce the residual amount of carbon black while obtaining a sufficient coloring effect, the content ratio can be preferably set to be 5% by mass or less, more preferably 3% by mass or less, and further preferably 2% by mass or less (for example, 1% by mass or less).

The cellulose resin composition according to the exemplary embodiment may contain other components as long as the resultant molded body does not lose desired appearance and properties. In order to obtain a molded body having high external-appearance quality, the total content of the cellulose resin (A) and the high refractive-index organic material (B) is preferably high. For example, the total content of the cellulose resin (A) and the high refractive-index organic material (B) relative to the amount of the cellulose resin composition excluding the carbon black (C) (the amount of the cellulose resin composition from which the carbon black (C) is removed) can be set to fall within the range of 90 to 100% by mass, preferably 95% by mass or more, more preferably 98% by mass or more and further preferably 99% by mass or more.

As the other components, additives usually used in common resin materials for molding may be contained. Examples of the additives include an antioxidant such as a phenol-based compound and phosphorous compound, a colorant, a light stabilizer, an ultraviolet absorber, an antistatic agent, an antibacterial/antifungal agent, a flame retardant and a plasticizer. In particular, additives usually used in common cellulose resins may be contained. Examples of the additives include a plasticizer, a flame retardant and ultraviolet absorber.

(Process for Producing Composition)

A process for producing the cellulose resin composition according to the exemplary embodiment is not particularly limited. The cellulose resin composition can be obtained, for example, by melt-mixing a cellulose resin, a high refractive-index organic material, carbon black and optional additives by a usual mixer. As the mixer, for example, a tumbler mixer, a ribbon blender, a single screw and a multi-screw extruder, a kneader or a compounding apparatus such as a kneading roll, can be used. After the melt-mixing, if necessary, granulation into an appropriate shape can be carried out; for example, pellets can be formed by a pelletizer.

(Molded Body)

The molded body formed of the cellulose resin composition according to the exemplary embodiment can be molded into a desired shape by a common molding method. The shape is not limited and the thickness of the molded body is not limited; however in order to obtain higher external-appearance quality, the thickness is preferably 0.5 mm or more, and more preferably 0.8 mm or more. Also, the upper limit of the thickness of the molded body is not particularly limited and can be appropriately set depending on a desired e.g., shape and strength. Even if the thickness is set, for example, 10 mm or less and further 5 mm or less, high external-appearance quality as well as sufficient mechanical strength can be obtained. Since the carbon black is distributed over the entire molded body (all directions including thickness direction), a molded body having a desired shape and high external-appearance quality can be obtained even if e.g., coating or a decorative film is not applied.

The cellulose resin composition according to the exemplary embodiment can be formed into a molded body in accordance with an intended use by a common molding method such as injection molding, injection compression molding, injection blow molding, extrusion molding and blow molding.

Since the molded body formed of the cellulose resin composition according to the exemplary embodiment has high external-appearance quality and excellent mechanical characteristics, the molded body can be used in place of members used in electronic devices, home appliances, various containers, building materials, furniture, writing materials, automobiles and household articles. The molded body can be used in, for example, housing and exterior parts of electronic devices or home appliances, various storage cases, dishes, interior members of building materials, interior materials of automobiles and other daily necessities.

According to the exemplary embodiment, it is possible to provide products containing a molded body formed of the resin composition of the present invention, such as electronic devices or home appliances, automobiles, building materials, furniture, writing materials and household articles.

Examples of use for electronic devices or home appliances include housing for personal computers, fixed phones, mobile phone terminals, smart phones, tablets, POS terminals, routers, projectors, speakers, lighting fixtures, calculators, remote controllers, refrigerators, washing machines, humidifiers, dehumidifiers, video recorders/players, vacuum cleaners, air conditioners, rice cookers, electric shavers, electric toothbrushes and dishwashers; and cases for mobile terminals such as smart phones.

Examples of use for automobiles include interior parts such as instrument panels, dashboards, cup holders, door trims, armrests, door handles, door locks, handles, brake levers, ventilators and shift levers.

Examples of use for building materials include interior members such as wall materials, floor materials, window frames and doorknobs.

Examples of use for furniture include packaging of drawers, bookshelves, tables and chairs.

Examples of use for writing materials include packaging of pens, pen cases, book covers, scissors, and cutters.

Examples of use for daily necessities include glass frames.

EXAMPLES

The present invention will be more specifically described by way of examples below.

Example 1

As the constitution materials of a desired composition, a cellulose resin (cellulose acetate propionate, DS of propionyl group=2.49, DS of an acetyl group=0.18, trade name: CAP-482-20, manufactured by Eastman Chemical Company), an AS resin (a copolymer of acrylonitrile (AN) and styrene (St), mass ratio AN/St=30/70, trade name: Stylac AS 789, manufactured by Asahi Kasei Corporation) and acidic carbon black (average particle diameter: 13 nm, acidity: pH3, trade name: Mitsubishi carbon black #2650, manufactured by Mitsubishi Chemical Corporation) were prepared.

Then, the cellulose resin (79 parts by mass), the AS resin (20 parts by mass) and the acidic carbon black (1 part by mass) were mixed well by hand. Note that, the resin materials were dried at 80° C. for 5 hours in advance.

A resin composition was formed from the resultant mixture in accordance with the following method 1 for forming a molded body. Then, a molded body (a sample for evaluation) using the composition was formed. The glossiness and brightness of the molded bodies obtained were evaluated in accordance with the following measurement methods. The results are shown in Table 1.

Example 2

Mixtures were obtained in the same manner as in Example 1 except that the constitution materials for desired compositions and blending ratios thereof shown in Table 1 were used.

A resin composition was formed from the resultant mixture and molded bodies (samples for evaluations 1 and 2) were then formed, in accordance with the following methods 1 and 2 for forming a molded body. The glossiness and brightness of the molded bodies obtained were evaluated in accordance with the following measurement methods. The results are shown in Table 1. Note that, Evaluation 1 in the Table shows the evaluation results of the molded bodies formed in accordance with method 1 for forming a molded body and Evaluation 2 shows the evaluation results of the molded bodies formed in accordance with method 2 for forming a molded body.

Example 3

A mixture was obtained in the same manner as in Example 1 except that the constitution materials for a desired composition and the blending ratio thereof shown in Table 1 were used. The same cellulose resin and carbon black as in Example 1 were used. An aromatic condensed phosphate (trade name: PX-200, manufactured by DAIHACHI CHEMICAL INDUSTRY CO., LTD.) was used as the phosphoric acid ester.

A resin composition was formed from the resultant mixture, and then molded bodies (samples for evaluations 1 and 2) were formed in accordance with the following methods 1 and 2 for forming a molded body. The glossiness and brightness of the molded bodies obtained were evaluated in accordance with the following measurement methods. The results are shown in Table 1.

Example 4

A mixture was obtained in the same manner as in Example 1 except that the constitution materials for a desired composition and the blending ratio thereof shown in Table 1 were used. The same cellulose resin, AS resin and carbon black as in Example 1 were used, and an aromatic condensed phosphate (trade name: PX-200, manufactured by DAIHACHI CHEMICAL INDUSTRY CO., LTD.) was used as the phosphoric acid ester.

A resin composition was formed from the resultant mixture and then molded bodies (samples for evaluations 1 and 2) were formed in accordance with the following methods 1 and 2 for forming a molded body. The glossiness and brightness of the molded bodies obtained were evaluated in accordance with the following measurement methods. The results are shown in Table 1.

Example 5

A mixture was obtained in the same manner as in Example 1 except that the constitution materials for a desired composition and the blending ratio thereof shown in Table 1 were used. The same cellulose resin and carbon black as in Example 1 were used and hexaphenoxycyclotriphosphazene (trade name: SPS-100, manufactured by Otsuka Chemical Co., Ltd.) was used as the phosphazene compound.

A resin composition was formed from the resultant mixture and then a molded body (a sample for evaluation 1) was formed in accordance with the following method 1 for forming a molded body. The glossiness and brightness of the molded body obtained were evaluated in accordance with the following measurement methods. The results are shown in Table 1.

Examples 6 and 7

Mixtures were obtained in the same manner as in Example 1 except that the constitution materials for desired compositions and the blending ratios thereof shown in Table 1 were used. The same cellulose resin and carbon black as in Example 1 were used and bisphenoxyethanol fluorene (BPEF) (trade name: BPEF, manufactured by Osaka Gas Chemicals Co., Ltd.) was used as the fluorene derivative.

Resin compositions were formed from the resultant mixtures in accordance with the following method 1 for forming a molded body, and then, molded bodies (samples for evaluation 1) were formed. The glossiness and brightness of the molded bodies obtained were evaluated in accordance with the following measurement methods. The results are shown in Table 1.

Comparative Examples 1 to 7, Reference Examples 1 and 2

Mixtures were obtained in the same manner as in Example 1 except that the constitution materials for desired compositions and the blending ratios thereof shown in Table 1 were used.

Resin compositions were formed from the resultant mixtures in accordance with the following methods 1 and 2 for forming a molded body, and then, molded bodies (samples for evaluations 1 and 2) were formed. The glossiness and brightness of the molded bodies obtained were evaluated in accordance with the following measurement methods. The results are shown in Table 1.

The constitution materials used in Examples, Reference Examples and Comparative Examples are shown below.

Cellulose resin: Cellulose acetate propionate, DS of propionyl group=2.49, DS of an acetyl group=0.18 (trade name: CAP-482-20, manufactured by Eastman Chemical Company), weight average molecular weight: 120,000 (in terms of standard polystyrene), number average molecular weight=39,000 (in terms of standard polystyrene)

AS resin: a copolymer of acrylonitrile (AN) and styrene (St) (mass ratio AN/St=30/70)(trade name: Stylac AS 789, manufactured by Asahi Kasei Corporation), weight average molecular weight: 42,000 (in terms of standard polystyrene), number average molecular weight=15,000 (in terms of standard polystyrene)

Phosphoric acid ester: aromatic condensed phosphate (trade name: PX-200, manufactured by DAIHACHI CHEMICAL INDUSTRY CO., LTD.)

Phosphazene compound: hexaphenoxycyclotriphosphazene (trade name: SPS-100, manufactured by Otsuka Chemical Co., Ltd.)

Fluorene derivative: bisphenoxyethanol fluorene (BPEF) (trade name: BPEF, manufactured by Osaka Gas Chemicals Co., Ltd., chemical name: 9,9-bis[4-(2-hydroxyethoxy)phenyl] fluorene)

PBS resin: polybutylene succinate (trade name: GSPla, glade: FZ71PD, manufactured by Mitsubishi Chemical Corporation)

Carbon black 1: acidic carbon black (average particle diameter: 13 nm, pH3) (trade name: Mitsubishi carbon black #2650, manufactured by Mitsubishi Chemical Corporation)

Carbon black 2: neutral carbon black (average particle diameter: 13 nm, pH6.5) (trade name: Mitsubishi carbon black #2600, manufactured by Mitsubishi Chemical Corporation)

Carbon black 3: neutral carbon black (average particle diameter: 24 nm, pH7.5) (trade name: Mitsubishi carbon black #40B, manufactured by Mitsubishi Chemical Corporation)

(Method 1 for Forming a Molded Body/Preparation of Samples for Evaluation 1)

<Kneading Method>

The mixture obtained was placed in a small twin-screw continuous kneader (product name: S1KRC kneader, manufactured by KURIMOTO, LTD.), kneaded at a temperature of 205 to 220° C. and a rotation speed of 140-150 m/minute, cooled in water, recovered and pelletized. The pellets obtained were dried at 80° C. for 5 hours. In Examples 1 and 2, Reference Example 1 and Comparative Examples 1, 2 and 5, the kneading temperature was set at 220° C.; in Reference Example 2 and Comparative Examples 3 and 4, the kneading temperature was set at 205° C.; in the other examples, the kneading temperature was set at 210° C.

<Molding Method>

The pellets obtained were dried again at 80° C. for 5 hours immediately before molding (and then put in use), and molded into the following shape by a small injection molding machine (product name: HAAKE Minijet II, manufactured by Thermo Electron Corporation).

Size of a molded body: thickness 2.4 mm, width 12.4 mm, length 80 mm

The molding conditions were set as follows.

Cylinder temperature of molding machine: 210 to 230° C.,

Mold temperature: 65 to 100° C.,

Injection pressure: 1200 bar (120 MPa)/injection time: 20 seconds, pressure keeping: 800 bar (80 MPa)/pressure keeping time: 10 seconds.

In Examples 1 and 2, Reference Example 1 and Comparative Examples 1, 2 and 5, the cylinder temperature was set at 230° C. and the mold temperature was set at 80-100° C.; in the other examples, the cylinder temperature was set at 210° C. and the mold temperature was set at 65° C.

The mold having a surface roughness of Ra=10 nm prepared by mirror polishing (surface roughness was evaluated by a laser microscope OLS4100 (product name) manufactured by OLYMPUS) was used.

(Method 2 for Forming a Molded Body/Preparation of Samples for Evaluation 2)

<Kneading Method>

The mixture obtained was placed in a twin-screw continuous kneader (442, L/D=38, product name: ZE40A, manufactured by Berstorff GmbH), kneaded at a temperature of 205 to 220° C. and a rotation speed of 120 rpm, cooled in water, recovered and pelletized. The pellets obtained were dried at 80° C. for 5 hours.

In Example 2, the kneading temperature was set at 220° C.; in Examples 3 and 4, the kneading temperature was set at 210° C.; in Reference Example 2 and Comparative Example 4, the kneading temperature was set at 205° C.

<Molding Method>

The pellets obtained were dried again at 80° C. for 5 hours immediately before molding (and put in use) and molded into the following shape by an injection molding machine (product name: NEX50, manufactured by Nissei Plastic Industrial Co., Ltd.).

Size of a molded body: thickness: 2.0 mm, width: 70 mm, length: 70 mm

The molding conditions at this time were set as follows:

The cylinder temperature of molding machine: 200 to 210° C.,

Mold temperature: 65° C.,

Injection pressure: 70-100 Mpa,

Pressure keeping: 60-80 Mpa.

The cylinder temperature was set at 210° C. in Examples 2 and 3, and 200° C. in the other examples.

A mold having a surface roughness of Ra=1 nm, which was prepared by mirror polishing (surface roughness was evaluated by a laser microscope OLS4100 (product name) manufactured by OLYMPUS) was used.

(Measurement of Glossiness)

The 20° specular gloss (GS20°) 20° of the evaluation samples obtained was measured by a glossimeter (product name: Glossimeter GM-268Plus manufactured by KONICA MINOLTA, INC., compatible specifications: ISO 2813, ISO 7668, ASTM D 523, ASTM D 2457, DIN 67 530, JIS Z 8741, BS 3900, BS 6161 (Part12)).

(Measurement of Brightness)

Brightness was measured by determining the reflection of the evaluation samples obtained above in accordance with the SCE mode (regular reflection is excluded) by a spectrophotometer (product name: spectrophotometer CM-3700A, manufactured by KONICA MINOLTA, INC., in accordance with JIS Z 8722 condition c, ISO7724/1, CIE No. 15, ASTM E1164, DIN5033 Teil7). Measurement diameter/illumination diameter was SAV: 3×5 mm/5×7 mm; reflection measurement conditions were di: 8° and de: 8° (diffused illumination·8° direction light receiving); viewing field: 10°; light source: D65 light source; and UV conditions: 100% Full. The brightness herein refers to L* of CIE1976L*a*b* color space.

TABLE 1

| | Composition ratio (parts by mass) | | | | | | | | | Evaluation 1 | | Evaluation 2 | |
|---|---|---|---|---|---|---|---|---|---|---|---|---|---|
| | Cellulose resin | AS resin | Phosphoric acid ester | Phosphazene compound | Fluorene derivative | PBS resin | Carbon black 1 (acidic) (particle diameter 13 nm) | Carbon black 2 (neutral) (particle diameter 13 nm) | Carbon black 3 (neutral) (particle diameter 24 nm) | Glossiness (20°) | Brightness (SCE) | Glossiness (20°) | Brightness (SCE) |
| Example 1 | 79 | 20 | — | — | — | — | 1 | — | — | 78 | 4.5 | — | — |
| Example 2 | 49 | 50 | — | — | — | — | 1 | — | — | 83 | 3.8 | 87 | 2.2 |
| Example 3 | 79 | — | 20 | — | — | — | 1 | — | — | 80 | 4.0 | 81 | 3.8 |
| Example 4 | 39 | 40 | 20 | — | — | — | 1 | — | — | 87 | 5.9 | 92 | 3.2 |
| Example 5 | 79 | — | — | 20 | — | — | 1 | — | — | 79 | 4.3 | — | — |
| Example 6 | 74 | — | — | — | 25 | — | 1 | — | — | 81 | 5.0 | — | — |
| Example 7 | 69 | — | — | — | 30 | — | 1 | — | — | 83 | 5.1 | — | — |
| Reference Example 1 | 99 | — | — | — | — | — | 1 | — | — | 73 | 3.4 | — | — |
| Comparative Example 1 | 99 | — | — | — | — | — | — | 1 | — | 74 | 3.7 | — | — |
| Comparative Example 2 | 99 | — | — | — | — | — | — | — | 1 | 74 | 9.2 | — | — |
| Reference Example 2 | 79 | — | — | — | — | 20 | 1 | — | — | 74 | 3.2 | 78 | 1.7 |
| Comparative Example 3 | 79 | — | — | — | — | 20 | — | 1 | — | 75 | 3.0 | — | — |
| Comparative Example 4 | 79 | — | — | — | — | 20 | — | — | 1 | 73 | 8.8 | 77 | 7.9 |
| Comparative Example 5 | 79 | 20 | — | — | — | — | — | 1 | — | 78 | 6.6 | — | — |
| Comparative Example 6 | 79 | — | 20 | — | — | — | — | 1 | — | 79 | 7.3 | — | — |
| Comparative Example 7 | 39 | 40 | 20 | — | — | — | — | 1 | — | 86 | 6.7 | — | — |

When Examples 1 to 7 are compared to Reference Example 1 and Comparative Examples 1 and 2 containing no high refractive-index material, it is found that the molded bodies of Examples 1 to 7 have high glossiness.

It is also found that if compared particularly to Comparative Example 2, the molded bodies of the Examples have low brightness (high jet color) in addition to high glossiness. A high refractive-index material is not used and carbon black is neutral and has a relatively large average particle diameter (24 nm) in Comparative Example 2; whereas, a high refractive-index material is used and carbon black is acidic and has a small average particle diameter (13 nm) in Examples 1 to 7. It can be said that the presence or absence of a high refractive-index material, difference in acidity and in particle diameter of carbon black influence the evaluation results. Thus, according to the exemplary embodiment, it is demonstrated that a molded body having high external-appearance quality (jet-black color) close to appearance of Japanese lacquering products can be formed.

When Examples 1 and 2 using the same carbon black are mutually compared, it is found that as the content of the high refractive-index organic material (AS resin) increases, higher glossiness can be obtained. In Example 4, since the content of the high refractive-index organic material (the total of the AS resin and phosphoric acid ester) is further high, further higher glossiness is obtained.

As described, it is demonstrated that glossiness is improved by adding a large amount of a high refractive-index organic material.

When Example 1 and Reference Example 2 using the same carbon black are mutually compared, the glossiness of the molded body of Example 1 using a high refractive-index AS resin is higher than that of Reference Example 2 using a low refractive-index PBS resin. Similarly, when Comparative Example 5 and Comparative Example 3 are mutually compared, the glossiness of the molded body of Comparative Example 5 using a high refractive-index AS resin is higher than that of Comparative Example 3 using a low refractive-index PBS resin. As described, it is demonstrated that even if the contents of the material to be added are the same, as the refractive index of the material itself increases, the glossiness is improved.

When Example 1 and Comparative Example 5; Example 3 and Comparative Example 6; and Example 4 and Comparative Example 7 (cases where a high refractive-index organic material is contained) are compared, it is found that the brightness of the cases (Examples 1, 3 and 4) where acidic carbon black was used is lower compared to the cases (Comparative Example 5, 6 and 7) where neutral carbon black was used.

In contrast, in cases where a high refractive-index organic material is not contained, when Reference Example 1 and Comparative Example 1; and Reference Example 2 and Comparative Example 3 are compared, it is found that the brightness does not largely differ regardless whether the carbon black is acidic or neutral.

As described, it is found that difference in acidity between the carbon black materials to be used in the presence of a high refractive-index material influences the brightness of the molded bodies. In other words, it can be said that an increase in brightness caused by addition of a high refractive-index material can be suppressed by using acidic carbon black.

Note that, as shown in the evaluation results of Comparative Examples 2 and 4, brightness increases as the particle diameter of carbon black increases.

As previously mentioned, in order to increase glossiness, the higher the content of a high refractive-index organic material, the more preferable. If the high refractive-index organic material is a low molecule compound, bleed out tends to easily occurs. To suppress the bleed out, a high refractive-index resin is preferably used as the high refractive-index organic material. As the high refractive-index resin, a resin excellent in compatibility with a cellulose resin is preferable. Since phase separation is suppressed by easing temperature requirement during molding, a high refractive-index resin (for example, AS resin) and a high refractive-index plasticizer component (low molecule compound: for example, phosphoric acid ester) are preferably used in combination, as is in Example 4.

In Example 4, high glossiness is obtained since an AS resin (high refractive-index resin) and a phosphoric acid ester (high refractive-index plasticizer component) are contained and the total content of these, more specifically, the content of a high refractive-index organic material (mass ratio B/A) is as large as 60/39. When a large amount of resin composition was kneaded well by a larger kneader to form a molded body (Method 2 for forming a molded body), phase separation decreasing the appearance quality was not observed. In contrast, in Example 2, since the content of an AS resin (high refractive-index resin) is large (B/A=50/49) but a plasticizer is not contained, it was necessary to increase a molding temperature. As a result, small spots presumably caused by phase separation were slightly observed.

In the foregoing, the present invention has been described with reference to the exemplary embodiments and the Examples; however, the present invention is not limited to the above exemplary embodiments and the Examples. Various modifications understandable to those skilled in the art may be made to the constitution and details of the present invention within the scope thereof.

The invention claimed is:

1. A cellulose resin composition comprising a cellulose resin (A), a high refractive-index organic material (B) and a carbon black (C), wherein
   the cellulose resin (A) is an acylated cellulose obtained by substituting at least part of hydrogen atoms of hydroxy groups of a cellulose with an acyl group having 2 to 4 carbon atoms,
   the carbon black (C) is an acidic carbon black,
   a mass fraction (B/A) of the high refractive-index organic material (B) to the cellulose resin (A) falls within a range of 10/90 to 70/30, and
   a content of the carbon black (C) relative to the total of the cellulose resin composition falls within a range of 0.05 to 10% by mass,
   the high refractive-index organic material (B) comprises a high refractive-index resin (B1),
   a mass fraction (B1/A) of the high refractive-index resin (B1) to the cellulose resin (A) is 20/80 or more, and
   the high refractive-index resin is a copolymer of acrylonitrile and styrene.

2. The cellulose resin composition according to claim 1, wherein the high refractive-index organic material (B) has a larger refractive index than the cellulose resin (A).

3. The cellulose resin composition according to claim 1, wherein the high refractive-index resin has an aromatic ring.

4. The cellulose resin composition according to claim 1, wherein a refractive index of the high refractive-index organic material (B) is 1.50 or more.

5. The cellulose resin composition according to claim 1, wherein the high refractive-index organic material (B) is a compatible organic material that is compatible with the cellulose resin (A).

6. The cellulose resin composition according to claim 1, wherein a pH value of the carbon black (C) is 5 or less.

7. The cellulose resin composition according to claim 1, wherein an average particle diameter of the carbon black (C) is within a range of 1 to 20 nm.

8. The cellulose resin composition according to claim 1, wherein a total content of the cellulose resin (A) and the high refractive-index organic material (B) relative to the amount of the cellulose resin composition excluding the carbon black (C) is 90% by mass or more.

9. The cellulose resin composition according to claim 1, wherein a mass fraction (B1/A) of the high refractive-index resin (B1) to the cellulose resin (A) is 30/70 or more.

10. The cellulose resin composition according to claim 1, wherein, in the cellulose resin (A), an acyl group introduction ratio ($DS_{AC}$) is 2.0 or more, and a hydroxy group remaining degree is 1.0 or less.

11. The cellulose resin composition according to claim 1, wherein, in the cellulose resin (A), an acyl group introduction ratio ($DS_{AC}$) is 2.4 or more, and a hydroxy group remaining degree is 0.6 or less.

12. The cellulose resin composition according to claim 1, wherein the high refractive-index organic material (B) contains a plasticizer in addition to the high refractive-index resin.

13. The cellulose resin composition according to claim 12, wherein the plasticizer is a phosphorus organic compound.

14. The cellulose resin composition according to claim 12, wherein a mass fraction (B2/B1) of the plasticizer (B2) to the high refractive-index resin (B1) is 10/90 to 70/30.

15. The cellulose resin composition according to claim 12, wherein the plasticizer is a phosphorus organic compound having an aromatic ring.

16. The cellulose resin composition according to claim 12, wherein the plasticizer is a phosphoric acid ester having an aromatic ring.

17. A molded body formed of the cellulose resin composition according to claim 1.

18. A product comprising the molded body according to claim 17.

* * * * *